(12) United States Patent
Si et al.

(10) Patent No.: US 11,750,375 B2
(45) Date of Patent: Sep. 5, 2023

(54) ENCRYPTION AND DECRYPTION METHOD AND DEVICE BASED ON BIT PERMUTATION AND BIT TRANSFORMATION

(71) Applicants: Zhuhai College of Science And Technology, Guangdong (CN); Jilin University, Jilin (CN)

(72) Inventors: Yujuan Si, Guangdong (CN);
Guanghui Feng, Guangdong (CN);
Liuqi Lang, Guangdong (CN);
Xiaoyang Fu, Guangdong (CN); Hao Wu, Guangdong (CN)

(73) Assignees: Zhuhai College of Science And Technology, Guangdong (CN); Jilin University, Jilin (CN)

( * ) Notice: Subject to any disclaimer, the term of this patent is extended or adjusted under 35 U.S.C. 154(b) by 185 days.

(21) Appl. No.: 17/428,405

(22) PCT Filed: Apr. 19, 2019

(86) PCT No.: PCT/CN2019/083409
§ 371 (c)(1),
(2) Date: Jan. 5, 2022

(87) PCT Pub. No.: WO2020/168629
PCT Pub. Date: Aug. 27, 2020

(65) Prior Publication Data
US 2022/0150054 A1     May 12, 2022

(30) Foreign Application Priority Data
Feb. 18, 2019   (CN) .......................... 201910119852.5

(51) Int. Cl.
*G06F 21/00*   (2013.01)
*H04L 29/06*   (2006.01)
(Continued)

(52) U.S. Cl.
CPC ............ *H04L 9/0825* (2013.01); *H04L 9/001* (2013.01); *H04L 9/0656* (2013.01); *H04L 9/14* (2013.01)

(58) Field of Classification Search
None
See application file for complete search history.

(56) References Cited

U.S. PATENT DOCUMENTS

2008/0292100 A1   11/2008  Komano et al.
2017/0373832 A1*  12/2017  Wurcker .................. G09C 1/00

FOREIGN PATENT DOCUMENTS

CN       203733220 U    7/2014
CN       105281894 A    1/2016
(Continued)

OTHER PUBLICATIONS

First Office Action for CN201910119852.5 dated Mar. 4, 2020.
(Continued)

*Primary Examiner* — Lisa C Lewis
(74) *Attorney, Agent, or Firm* — Kelly & Kelley, LLP

(57) ABSTRACT

Disclosed are an encryption and decryption method and device based on bit permutation and bit transformation. The method includes: configuring a memory space, and preparing corresponding storage spaces for a plaintext file, a ciphertext file and a key file; changing a bit value of an initial key stream according to a bit operation rule, so as to obtain a bit-transformed key stream, changing a bit value of a plaintext according to the bit operation rule depending on the key stream; on the basis of a bit-transformed plaintext stream, according to a bit permutation rule depending on the key stream, performing a bit permutation operation on the bit-transformed plaintext stream, and randomly distributing the plaintext stream in a ciphertext stream, so as to obtain a target ciphertext and store the same as a file.

20 Claims, 4 Drawing Sheets

S1, configuring a memory space, and preparing corresponding storage spaces for a plaintext file, a ciphertext file, and a key file, wherein an initial key file comes from a known coding sequence S2, changing a bit value of an initial key stream according to a bit operation rule, so as to obtain a bit-transformed key stream, and then changing a bit value of a plaintext according to the bit operation rule depending on the key stream S3, on the basis of a bit-transformed plaintext stream, according to a bit permutation rule depending on the key stream, performing a bit permutation operation on the bit-transformed plaintext stream, and randomly distributing the plaintext stream in a ciphertext stream, so as to obtain a target ciphertext and store the target ciphertext as a file

(51) Int. Cl.
*H04L 9/08* (2006.01)
*H04L 9/00* (2022.01)
*H04L 9/06* (2006.01)
*H04L 9/14* (2006.01)

(56) References Cited

FOREIGN PATENT DOCUMENTS

| | | | |
|---|---|---|---|
| CN | 105577364 | A | 5/2016 |
| CN | 106953875 | A | 7/2017 |
| CN | 108429613 | A | 8/2018 |
| CN | 109194461 | A | 1/2019 |
| EP | 2190143 | A1 | 5/2010 |
| JP | 2009139899 | A | 6/2009 |
| WO | 0046954 | A1 | 8/2000 |

OTHER PUBLICATIONS

Second Office Action for CN201910119852.5 dated Sep. 14, 2020.
Cui Yeqin et al. "Chaotic image encryption algorithm based on single image local scrambling and dynamic feedback diffusion" Ocy. 11, 2016, www.cnki.net.
Mukta Sharma, "Comparative Analysis of Block Key Encryption Algorithms" International Journal of Computer Applications, vol. 145—No. 7, Jul. 2016.
Feng Guang-chao "The research and Implementation of Speech Scrambler", Apr. 2014, Electronics and Communication Engineering Graduate School of National University of Defense Technology Changsha, Hunan, P.R.China.
Zhang Ya et al. "Transposition Cryptosystem and the Future Expectation" Jun. 2013 Journal of Beijing University of Posts and Telecommunications.

\* cited by examiner

ENCRYPTION AND DECRYPTION METHOD AND DEVICE BASED ON BIT PERMUTATION AND BIT TRANSFORMATION

CROSS-REFERENCE TO RELATED APPLICATIONS

This application is a national stage filing under 35 U.S.C. § 371 of international application number PCT/CN2019/083409, filed Apr. 19, 2019, which claims priority to Chinese patent application No. 201910119852.5 filed Feb. 18, 2019. The contents of these applications are incorporated herein by reference in their entirety.

TECHNICAL FIELD

The present disclosure relates to an encryption and decryption method and device based on bit permutation and bit transformation, and belongs to the field of digital communication technologies and information encryption. The present disclosure may be generally used for encrypting network communication information, aerospace digital remote-control instruction and data, unmanned aerial vehicle digital remote control communication data, airborne early warning aircraft digital communication command system information, GPS satellite digital communication data, mobile phone communication, e-mail, electronic financial data transmission, and the like. In the aspect of image coding, images of various formats may be encrypted, so that the intellectual property rights of the images are protected. After encrypting military, political and diplomatic documents, the documents may be transmitted by a civil communication network, thus saving a cost of file transmission.

BACKGROUND

Stream cipher is generally a symmetric key technology, which has become an important cryptosystem due to the advantages of simple implementation, fast encryption speed, and no spread of errors generated in ciphertext transmission in a plaintext. At present, the stream cipher technology still maintains its advantages in confidential institutions and mobile communication fields, and is one of the most popular cryptosystems today. In order to ensure information security, the research and development, and design of many stream cipher technologies are basically performed in a confidential state. Countries often restrict the export of stream cipher technologies and products as military products.

Nowadays, the research direction of the stream cipher mainly focuses on the design of a key stream generator and an attack way on a key stream, which are usually based on a mathematical model and use a complex algebraic operation, a Boolean operation, a pseudo-random number, a linear shift register, and a clock control sequence; and a network sequence, a cellular automaton, a chaos theory, and the like are combined to complete the encryption, decryption and attack of the stream cipher. Successful methods in the design of the key stream generator include A5, RC4, K2, and the like. After years of research, many scholars have mastered the ways of attacking and deciphering the above methods. In 2003, Courtois and Meier applied an algebraic attack to a stream cipher algorithm based on a linear feedback shift register in the European Cryptography Annual Conference, and the "algebraic attack", as a new research hot spot in the field of stream cipher, analyzed the security of the cryptosystem from a new angle, and was transformed into solving a problem of an overdetermined multivariable equation, which had a great impact on the design of a traditional cryptosystem.

1. Characteristics of Traditional Stream Cipher Technology (1) A key of the traditional stream cipher technology is to generate a (pseudo) random sequence as a key stream through various key stream generators, so that an attack on the stream cipher also focus on the key stream generator.

(2) The traditional stream cipher technology randomly changes 1 to 0 and 0 to 1 by an exclusive-or operation of the key stream and the plaintext, so as to obtain a ciphertext; and original binary characters are restored by the exclusive-or operation of the key stream and the plaintext during decryption, so as to obtain the plaintext. Therefore, the essence of the stream cipher is to transform the plaintext in a binary bit according to a certain rule to obtain the ciphertext.

2. Technical Points of New Method of Stream Cipher in the Patent Application

Quick sort algorithm, proposed by Tony Hoare, is rated as one of the top ten algorithms in the 20th century, with a main idea based on element permutation. Stream cipher RC4 method developed by Ron Rivest from Massachusetts Institute of Technology is probably the most widely used stream cipher in the world, with a main idea of generating the key stream based on the permutation of the initial key stream.

Therefore, we conceive of why we do not directly perform bit permutation and bit transformation on the plaintext according to a certain rule depending on the key stream, and then generate the ciphertext. However, permutation rules in the traditional stream cipher are all applied to the key stream.

SUMMARY

The method of the present disclosure is an innovative method in the field of stream cipher encryption and decryption, which is different from a traditional stream cipher encryption technology in that the method does not depend on an exclusive-or operation, but is based on permutation and transformation operations in a binary bit stream of a plaintext, without a strict requirement on a uniformity of a key stream. Another important difference between the method of the present disclosure and the traditional stream cipher technology is that a permutation rule used in the method is used for the plaintext instead of the key stream.

In the method of the present disclosure, an existing known coding sequence (which may be called a true random sequence) is used as an initial key stream. The initial key stream may come from various types of files, such as a text file, an audio, a video, a picture, and the like, and may also come from a pseudo-random sequence and various chaotic signals generated by various key stream generators, which means that a code uniformity of the initial key stream on a binary system has little influence on the algorithm. On a premise of the existing technology, when a length of a key is 128 bits, it is almost impossible to search the key on a computer by an exhaustive method (a brute-force method).

A first aspect of the technical solution of the present disclosure is an encryption and decryption method based on bit permutation and bit transformation, and the method includes the following steps of:

S1: configuring a memory space, and preparing corresponding storage spaces for a plaintext file, a ciphertext file, and a key file, wherein an initial key file comes from a known coding sequence and serves as a shared file for encryption and decryption;

S2: changing a bit value of an initial key stream according to a bit operation rule, so as to obtain a bit-transformed key stream, and then changing a bit value of a plaintext according to the bit operation rule depending on the key stream; and S3: on the basis of a bit-transformed plaintext stream, according to a bit permutation rule depending on the key stream, performing a bit permutation operation on the bit-transformed plaintext stream, and randomly distributing the same in a ciphertext stream, so as to obtain a target ciphertext and store the same as a file.

Further, the step S1 includes:

initializing the plaintext file, loading the plaintext file needing to be encrypted, and setting a number of code elements for the key file, wherein a byte length of the key file is capable of being customized; and the coding sequence for the initial key file comes from at least one of a text file, an audio, a video, a picture, an image, a graph, a pseudo-random code, and a chaotic value.

Further, the step S2 includes:

by means of a pseudo-random sequence and various chaotic signals generated by various key stream generators, or by means of a random file with uniform code distribution on a binary system, providing a bit transformation operation rule.

Further, in the step S2, the bit operation rule includes at least one of the following operation rules:

rule 1: negating a binary bit meeting the following Boolean function $$F(j)=(C+X\times j)\,\mathrm{MOD}\ Y==Z,$$

wherein C, X and Z are integers determined in advance, Y is a prime number, and j is a serial number of a binary bit of the key stream; "MOD" represents a remainder operation, and "==" represents an equality judgment operation; or rule 2: negating according to a true value bit or a false value bit of the key stream.

Further, the step S3 includes:

performing grouped bit permutation on the bit-transformed plaintext stream for one or more times; and/or performing grouped bit permutation on an initial ciphertext that is used as a parameter for one or more times; so as to obtain the ciphertext file after being encrypted for one or more times.

Further, in the step S3, the bit permutation operation includes steps of:

S311: setting double-ended pointers in each group, wherein values of the two pointers are legal positions of a round-robin queue composed of a binary stream of a plaintext and a key, and an initial distance between the two pointers is configured to be a length of the binary stream of the plaintext and the key;

S312: scanning the plaintext and the key in a first pass, moving the first pointer and the second pointer in an opposite direction, and when both the first pointer and the second pointer point to a false value bit of the key stream, permuting the bit value of the plaintext;

S313: resetting the double-ended pointers in each group, so that the two pointers move in an opposite direction, the values of the two pointers are capable of being the legal positions of the round-robin queue composed of the binary stream of the plaintext and the key, and a reset distance between the pointers is the length of the binary stream of the plaintext and the key; and S314: scanning the plaintext and the key in a second pass, moving the first pointer and the second pointer in an opposite direction, and when both the first pointer and the second pointer point to a true value bit of the key stream, permuting the bit value of the plaintext.

Further, in the step S3, the bit permutation operation includes steps of:

S321: setting double-ended pointers in each group and making the two pointers move in a same direction or opposite direction, wherein values of the two pointers are legal positions of a round-robin queue composed of a binary stream of a plaintext and a key, and an initial distance between the two pointers is not configured;

S322: scanning the plaintext and the key only in one pass, moving the first pointer and the second pointer, when the first pointer points to a false bit of the key stream and the second pointer points to a true bit of the key stream, permuting the bit value of the plaintext corresponding to the first pointer and the second pointer, and ending when one of the pointers already walks around the round-robin queue of the plaintext or the key; and S323: permuting the bit value of the plaintext at an ending position of the pointer.

Further, the above method further includes: respectively creating a plaintext encrypted random number, a ciphertext encrypted random number, and a key encrypted random number correspondingly for the plaintext file, the ciphertext file, and the key file, and generating corresponding working pointers according to values of the encrypted random numbers; performing working pointer displacement reading on the plaintext file, the ciphertext file, and the key file; and circularly traversing the working pointer for a plurality of times, and according to a value of the binary bit of the key stream pointed by the working pointer, iterating the plaintext file for a plurality of times to obtain the ciphertext file.

A second aspect of the technical solution of the present disclosure is a computer device, including a memory, a processor, and a computer program stored on the memory and executable on the processor, wherein the processor, when executing the program, implements the above steps.

A third aspect of the technical solution of the present disclosure is a computer-readable storage medium storing a computer program that, when executed by a processor, implements the above steps.

Features of the technical solution of the present disclosure are as follows.

1. The permutation and transformation rules of the bit stream of the plaintext are a core of the method, which are also the biggest difference between the present method and the traditional stream cipher method.

2. The initial key stream comes from a wide range of sources, and there is a low requirement on the code uniformity of the initial key stream, which means that the code uniformity of the initial key stream has little influence on the algorithm. This is another important difference between the present method and the traditional stream cipher technology.

3. The key stream generator is designed based on the bit operation rule. The initial key may be of any length, and with the increase of the byte length of the key, encryption complexity is also increased.

4. The method may be easily implemented in software by using a computer algorithm and programming, with time complexity and space complexity not higher than those of the traditional method.

5. With strong randomness and unpredictability, the method is simple, but is extremely difficult to be decrypted.

6. There is no traditional one-to-one and one-to-many relationship between the plaintext and the ciphertext in the encryption method. Disordered encryption is employed, which means that a relationship between the plaintext and the ciphertext is the most complex many-to-many relationship.

7. The cipher uniformity is higher than that of encryption by the traditional stream cipher method.

8. The technology follows a one-time pad cryptosystem proposed by Shannon.

9. Transmission may be performed in an existing public communication channel.

10. The plaintext may be used for encryption, sending, and receiving, and a three-separation principle is used in decryption, so that the security system is safer.

BRIEF DESCRIPTION OF DRAWINGS

FIG. 2 shows a bit transformation process of an initial key stream according to an embodiment of the present disclosure.

FIG. 3 shows a bit transformation process of a plaintext stream according to an embodiment of the present disclosure.

FIG. 4 shows an ungrouped bit permutation process in one pass of a plaintext stream according to an embodiment of the present disclosure.

FIG. 5 shows representation of an extended ASCII code of the initial key stream according to an embodiment of the present disclosure.

FIG. 6 shows a key stream obtained after bit transformation of the initial key stream according to an embodiment of the present disclosure.

FIG. 7 shows a ciphertext generated after encryption by the method of the present invention according to an embodiment of the present disclosure.

FIG. 8 shows a ciphertext generated after encryption by a traditional method according to an embodiment of the present disclosure.

FIG. 9 shows an ungrouped bit permutation process in one pass of a ciphertext stream according to an embodiment of the present disclosure.

FIG. 10 shows a bit transformation process of a pseudo-plaintext stream according to an embodiment of the present disclosure.

DETAILED DESCRIPTION

Figure 1:
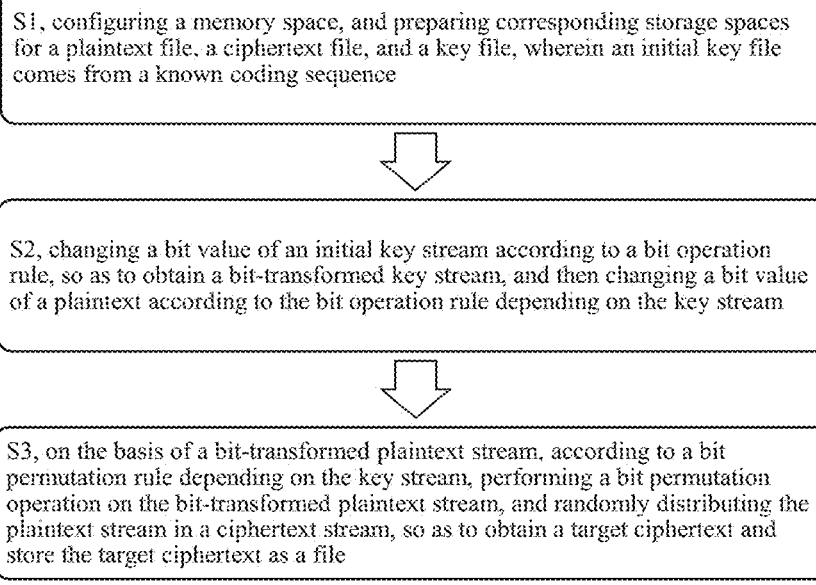
FIG. 1 is an overall flow chart of a method according to the present disclosure.

Basic idea, encryption example, decryption example, and specific embodiments of the present disclosure will be clearly and completely described in four parts with reference to the embodiments and the accompanying drawings hereinafter to fully help understand the purpose, solution, and effect of the present disclosure.

I. Basic Idea of the Present Disclosure

Different from a traditional stream cipher in which permutation rules are all applied to a key stream, a method of the present disclosure directly performs bit permutation and bit transformation on a plaintext according to a certain rule depending on the key stream, and then a ciphertext is generated. With reference to FIG. 1, the method according to the present disclosure generally includes steps of: S1: configuring a memory space, and preparing corresponding storage spaces for a plaintext file, a ciphertext file and a key file, wherein an initial key file comes from a known coding sequence and serves as a shared file for encryption and decryption; S2: changing a bit value of an initial key stream according to a bit operation rule, so as to obtain a bit-transformed key stream, and then changing a bit value of a plaintext according to the bit operation rule depending on the key stream; and S3: on the basis of a bit-transformed plaintext stream, according to a bit permutation rule depending on the key stream, performing a bit permutation operation on the bit-transformed plaintext stream, and randomly distributing the plaintext stream in a ciphertext stream, so as to obtain a target ciphertext and store the same as a file. An existing known coding sequence (which may be called a true random sequence) is used as an initial key stream. The initial key stream may come from various types of files, such as a text file, an audio, a video, a picture, and the like, and may also come from a pseudo-random sequence and various chaotic signals generated by various key stream generators. In addition, an initial ciphertext C may also serve as a parameter for grouping permutation for a plurality of times to obtain a ciphertext C" encrypted for a plurality of times, which further improves a randomness and an unpredictability of information.

When a special signal, such as all 0 or all 1 in value, is transmitted, the special signal is easy to be decrypted if only depending on the permutation rule for encryption. In the solution of the embodiment, introduction of the bit transformation rule can avoid such situation. By using the method, not only a ciphertext in discrete distribution can be obtained, but also a code uniformity of the ciphertext is much higher than that of the plaintext by using a hash function and a bit operation. By designing different permutation rules and bit transformation rules, encryption and decryption algorithm sets are formed, and an uncertainty of the permutation rule, the bit transformation rule, and the key is an advantage of the algorithm.

Based on a data stream encryption technology, the algorithm is an encryption system of binary stream discrete bit mapping established by depending on the key. A quintuple group (M, C, K, E, D) is used in the encryption system as a theoretical basis of encryption and decryption. In the quintuple group proposed herein, M is a plaintext code element set, C is a cipher code element set, P is a reference byte code element set (also called a key set), E is an encryption algorithm set, and D is a decryption algorithm set. These sets have the following characteristics.

1. $M = \{M_0, M_1, \ldots, M_{len(M)-1}\} = \{m_0, m_1, \ldots, m_{8len(M)-2}, m_{8 \times len(M)-1}\}$, wherein $len(M)$ is a number of bytes of the plaintext, and $8 \times len(M)$ is a number of binary bits of the plaintext; $M_i (i \in [0, len(M)-1])$ is a byte of the plaintext; and $m_j \in \{0,1\} j \in [0, 8 \times len(M)-1]$ is a binary bit of the plaintext.

2. $K = \{K_0, K_1, \ldots, K_{len(K)-1}\} = \{key_0, key_1, \ldots, key_{8len(K)-2}, key_{8 \times len(K)-1}\}$ wherein $len(K)$ is a number of bytes of the key, and $8 \times len(K)$ is a number of binary bits of the key; $K_i (i \in [0, len(K)-1])$ is a byte of the key; and $key_j \in \{0,1\}, j \in [0, 8 \times len(K)-1]$ is a binary bit of the key.

3. $C = \{C_0, C_1, C_{len(C)-1}\} = \{c_0, c_1, \ldots, c_{8len(C)-2}, c_{8 \times len(C)-1}\}$ wherein $len(C)$ is a number of bytes of the ciphertext, $len(C) = len(M)$ means that a length of the plaintext is equal to that of the ciphertext, and $8 \times len(C)$ is a number of binary bits of the ciphertext; $C_i (i \in [0, len(C)-1])$ is a byte of the ciphertext; and $c_j \in \{0,1\}, j \in [0, 8 \times len(C)-1]$ is a binary bit of the ciphertext.

4. Information in M, K and C sets is a byte character set composed of binary code elements $\{0,1\}$, wherein numbers of the code elements {1} in the sets are respectively recorded as sum(M), sum(K), and sum(C), and sum(M) is not necessarily equal to sum(C).

5. Elements of the encryption algorithm set E are bit permutation and bit transformation rule sets for an encryption operation.

6. Elements of the decryption algorithm set D are bit permutation and bit transformation rule sets for a decryption operation. The rule in the set E should have unique rule correspondingly in the set D, and the encryption rule and the decryption rule are reversible.

Encryption and decryption solutions of the present disclosure are described by the embodiments hereinafter.

II. Encryption Example

In order to demonstrate an execution flow of the method according to the present disclosure, Example 1, Example 2, and Example 4 all use a simple permutation rule, which means that all elements (binary bits of the plaintext) are permuted as a group. In order to demonstrate a code uniformity of the method according to the present disclosure, Example 3 uses grouping permutation.

Example 1

Assuming that all files use an extended ASCII code (an IBM extended character set) as a coding mode, according to the encryption algorithm shown in a method 1, key K' is obtained from an initial key stream K in Example 1 by bit transformation, M' is obtained from a plaintext M by bit transformation with reference to the key K', and then the transformed plaintext M' is subjected to bit permutation according to the key stream to finally obtain a ciphertext C.

Figures 2, 3, 4:
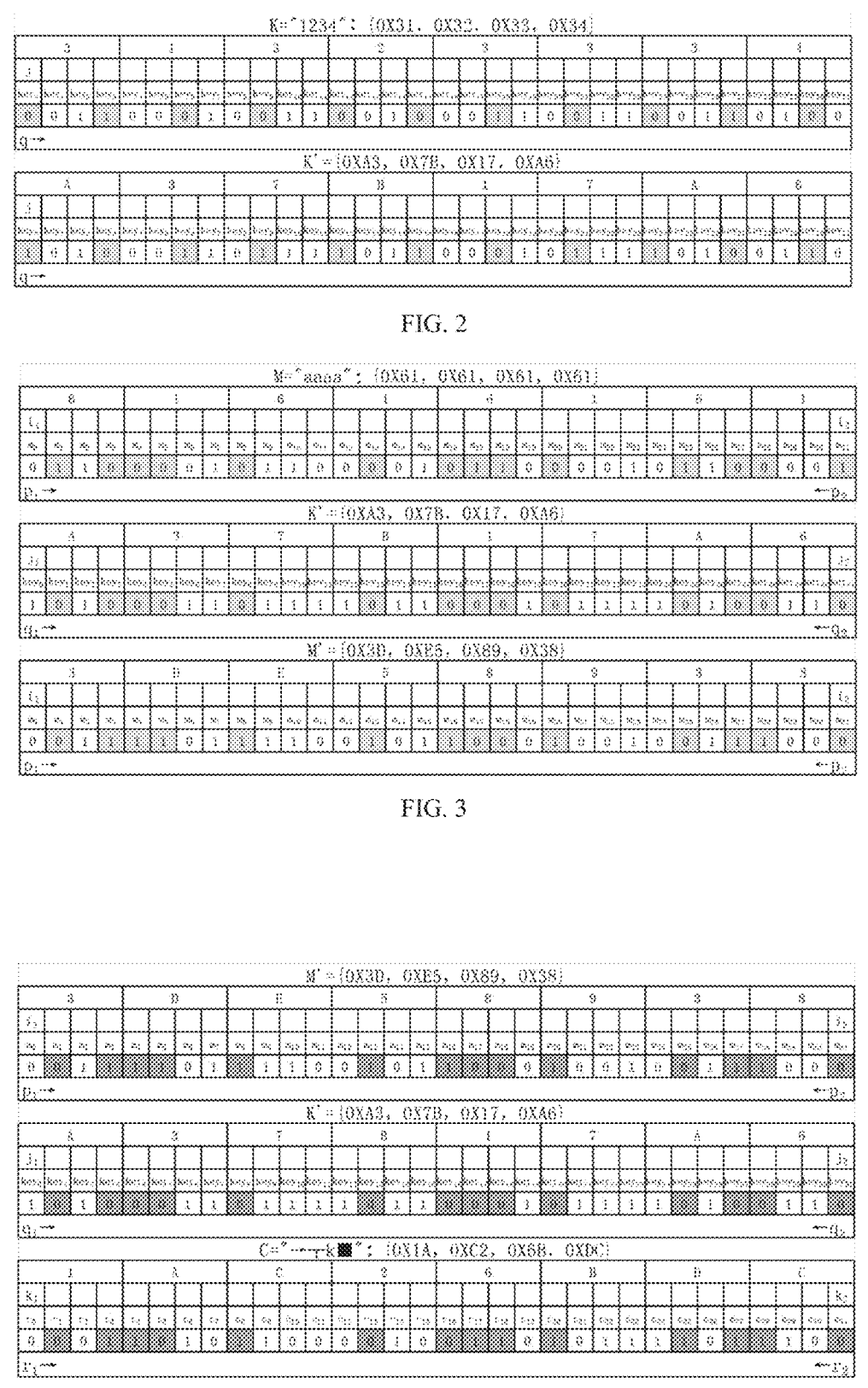

$K=\{\text{"1234"}\}=\{0X31, 0X32, 0X33, 0X34\}_{16}=\{00110001, 00110010, 00110011, 00110100\}_2.$ $K'=\{0XA3, 0X7B, 0X17, 0XA6\}_{16}=\{10100011, 01111011, 00010111, 10100110\}_2.$ $M=\{\text{"aaaa"}\}=\{0X61, 0X61, 0X61, 0X61\}_{16}=\{01100001, 01100001, 01100001, 01100001\}_2.$ $M'=\{0X3D, 0XE5, 0X89, 0X38\}_{16}=\{00111101, 11100101, 10001001, 00111000\}_2.$ $C=\{\text{"→■k■"}\}=\{0X1A, 0XC2, 0X6B, 0XDC\}_{16}=\{00011010, 11000010, 01101011, 11011100\}_2.$ A bit transformation process of the initial key stream may also refer to FIG. 2. A bit transformation process of the plaintext stream may refer to FIG. 3. An ungrouping bit permutation process in one pass of the plaintext stream may refer to FIG. 4.

Note:

1. K={"1234"} represents the initial key. {0X31, 0X32, 0X33, 0X34} is an extended ASCII code (a hexadecimal system) of the initial key "1234", which is converted into a binary system to obtain {00110001, 00110010, 00110011, 00110100}.

2. K' represents a final key obtained after bit transformation of a specific bit of the initial key K, {0XA3, 0X7B, 0X17, 0XA6} is representation of an extended ASCII code (a hexadecimal system), which is converted into a binary system to obtain {10100011, 01111011, 00010111, 10100110}.

3. M={"aaaa"} represents a plaintext, and is an input sequence for encryption. {0X61, 0X61, 0X61, 0X61} is an extended ASCII code (a hexadecimal system) of the plaintext "aaaa", which is converted into a binary system to obtain {01100001, 01100001, 01100001, 01100001}.

4. M' represents a pseudo-plaintext sequence generated after negating partial binary bits of the plaintext according to specific bits ("false" value binary bits) of the key bit by bit. {0X3D, 0XE5, 0X89, 0X38} is an extended ASCII code (a hexadecimal system) of M', which is converted into a binary system to obtain {00111101, 11100101, 10001001, 00111000}, as shown in FIG. 3.

5. C={"→■k■"} represents a ciphertext, and is an encrypted output sequence. {0X1A, 0XC2, 0X6B, 0XDC} is an extended ASCII code (a hexadecimal system) of the ciphertext "→■k■", which is converted into a binary system to obtain {00011010, 11000010, 01101011, 11011100}, as shown in FIG. 4.

6. The plaintext, the key, and the ciphertext all use a logical structure of a round-robin queue, which may be started to be calculated at any position in the queue, and initial values of bit orders are now taken as $i_1=0$, $j_1=0$, $k_1=0$, $i_2=31$, $j_2=31$, and $k_2=31$. Therefore, working pointers $p_1$ and $p_2$ point to plaintexts M[0] and M[31], $q_1$ and $q_2$ point to keys K[0] and K[31], and $r_1$ and $r_2$ point to ciphertexts C[0] and C[31].

7. In the example, the bit transformation rule applied to the initial key stream is to negate the binary bits meeting a formula of $(C+X\times j)$ MOD $Y=Z$ in the initial key stream, wherein j is called "bit order", which is a serial number of the binary bit of the key stream, and starts from 0 in the example. C, X, Y and Z are integers determined in advance, which are 0, 1, 3 and 0 respectively in the example. In FIG. 2, gray shading parts of the initial key K represent specific bits meeting the above formula.

8. In the example, the bit transformation rule applied to the plaintext is to negate according to the specific bits of the key K' bit by bit, which are "false" value binary bits in the example. Gray shading parts in the plaintext M represent plaintexts corresponding to "false" value parts of the key K', and gray shading parts in the pseudo-plaintext sequence M' are results of negating the gray shading parts in the plaintext M bit by bit. In FIG. 3, the gray shading parts of the plaintext M represent specific bits meeting the above formula.

9. In the example, the bit permutation rule applied to plaintext is to bidirectionally scan corresponding bits of the pseudo-plaintext stream M', the key stream K', and a ciphertext space C at the same time, and $i_1$ and $i_2$, $j_1$ and $j_2$, as well as $k_1$ and $k_2$ move in an opposite direction at the same time. In a scanning process in a first pass, when $K'[j_1]$ and $K'[j_2]$ are both false values, $M'[i_1]$ and $M'[i_2]$ are exchanged and then stored in $C[k_1]$ and $C[k_2]$. In a scanning process in a second pass, when $K'[j_1]$ and $K'[j_2]$ are both true values, $M'[i_1]$ and $M'[i_2]$ are exchanged and then stored in $C[k_1]$ and $C[k_2]$, and a finally obtained ciphertext is shown in FIG. 4.

Example 2

Assuming that all files use the extended ASCII code (the IBM extended character set) as the coding mode, according to the encryption algorithm shown in the method 1 in Example 1, the plaintext M in Example 2 is subjected to bit permutation and bit transformation under an effect of the key K, and the ciphertext C is finally obtained.

$K=\{\text{"1234"}\}=\{0X31,0X32,0X33,0X34\}_{16}=\{00110001,00110010,00110011,00110100\}_2.$ $K'=\{0XA3,0X7B,0X17,0X46\}_{16}=\{10100011,01111011,00010111,10100110\}_2.$ $M=\{\text{"9βix"}\}=\{0X39,0XE1,0X69,0X78\}_{16}=\{00111001,11100001,01101001,01111000\}_2.$ $M'=\{0X46,0X46,0X83,0X85\}_{16}=\{01000110,01000110,10000011,10000101\}_2.$ $C=\{\text{"aaaa"}\}=\{0X61,0X61,0X61,0X61\}_{16}=\{01100001,01100001,01100001,01100001\}_2.$ Note: results of Example 1 show that a same plaintext character "0X61" has corresponding ciphertext characters "0X1A", "0XC2", "0X6B", and "0XDC". Meanwhile, as shown in Example 2, for different plaintexts "0X39", "0XE1", "0X69", and "0X78", a same ciphertext "0X61" may be obtained by the method of the present disclosure, which indicates that there is a disordered correspondence between the plaintext and the ciphertext encrypted by the method of the present disclosure. Taking the extended ASCII code as an example, that is, each octet binary plaintext character has 256 corresponding possible octet binary ciphertext characters after encryption, and similarly, each octet binary ciphertext character also has 256 corresponding possible octet binary plaintext characters after decryption.

Example 3

Assuming that all files use the extended ASCII code (the IBM extended character set) as the coding method, in the example, in order to improve the code uniformity, in addition to using a complex bit transformation rule, a grouping encryption method is also used. 256 "a" of the plaintext M are divided into 11 groups for encryption under an effect of the key K', and the ciphertext obtained has as many as 158 different characters (this value varies with the algorithm and the key), while only 16 different ciphertext characters are obtained by a traditional stream cipher method. In the example, the ciphertext generated after encryption by the method of the present disclosure is shown in FIG. 7, which may be compared with the ciphertext generated after encryption by the traditional method shown in FIG. 8.

Figures 5, 6, 7, 8, 9:
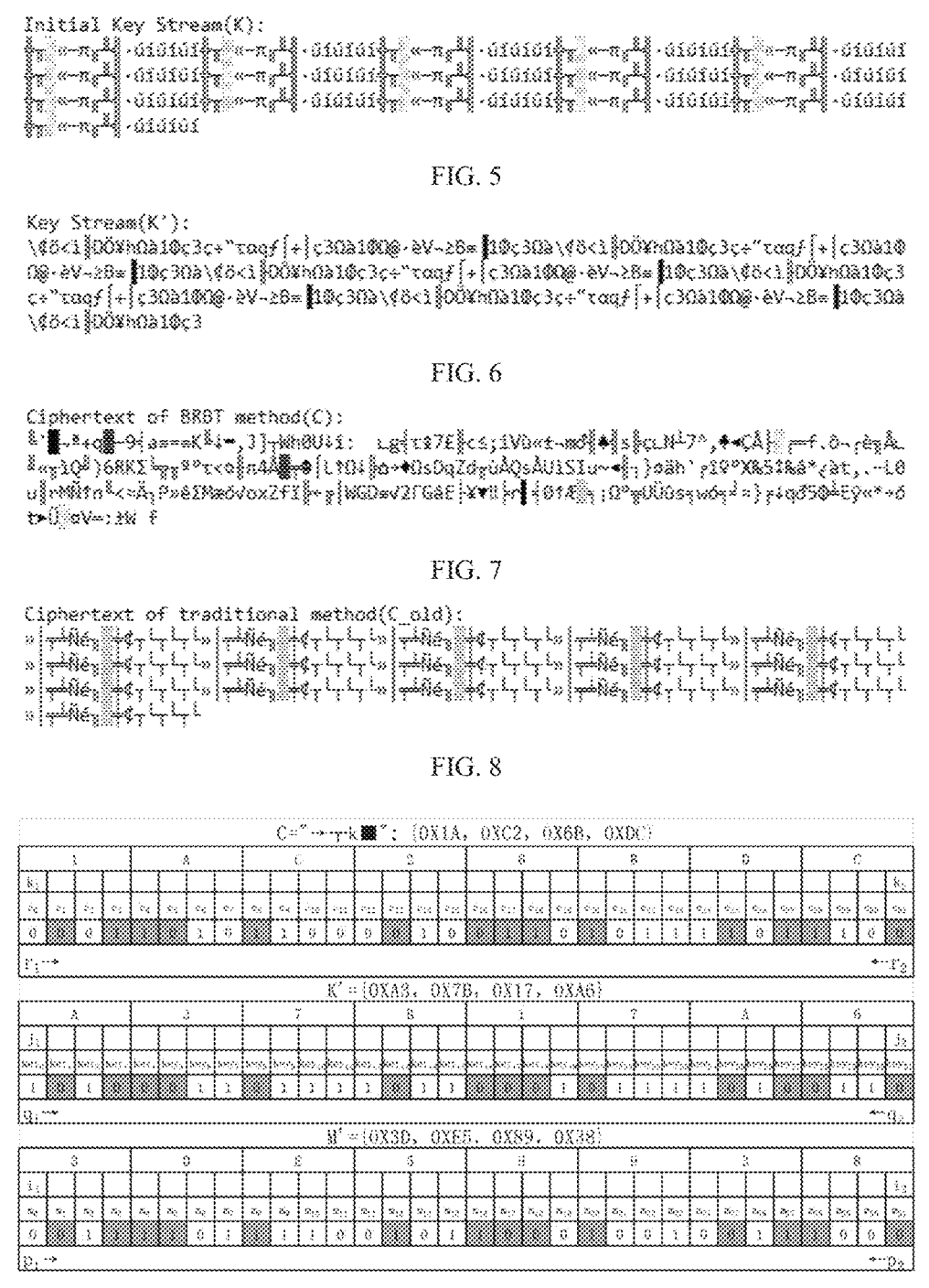

K={"我爱你中国!!!"} (There are a total of 8 bytes of a 128-bit binary system, and representation of an extended ASCII code of K refers to FIG. 5)

M={"aaaaaaaaaaaaaaaaaaaaaaaaaaaaaaaaaaaaaaaa-
aaaaaaaaaaaaaaaaaaaaaaaaaaaaaaaa
aaaaaaaaaaaaaaaaaaaaaaaaaaaaaaaaaaaaaaaa-
aaaaaaaaaaaaaaaaaaaaaaaaaaaaaaaa
aaaaaaaaaaaaaaaaaaaaaaaaaaaaaaaaaaaaaaaa-
aaaaaaaaaaaaaaaaaaaaaaaaaaaaaaaa aaaaaaaaaaaaaa"}

Note:

(1) M represents a plaintext with a total of 256 bytes, and is an input sequence for encryption.

(2) K represents an initial key stream with a total of 16 bytes (i.e., a 128-bit binary system), and a dimension of a key space is 256 bytes. Therefore, the initial key stream is used to circularly fill the key space for 16 times, and is shown in FIG. 5 when represented as an extended ASCII code.

(3) K' represents a key stream, and the bit transformation rule for acquiring the key stream is to negate the binary bits meeting a formula of $(C_1+X_1 \times j)$ MOD $Y_1=Z_1$ or $(C_2+X_2 \times j)$ MOD $Y_2=Z_2$ in the initial key stream, wherein j is called "bit order", which is a serial number of the binary bit of the key stream, and starts from 0 in the example. $C_1$, $X_1$, $Y_1$, $Z_1$, $C_2$, $X_2$, $Y_2$, and $Z_2$ are integers determined in advance, and values in the example are 0, 1, 3, 0, 0, 1, 7 and 0. In the example, the key stream K' is obtained from the initial key stream K after bit transformation as shown in FIG. 6.

(4) C represents a ciphertext obtained through encryption by the method of the present disclosure, and is an encrypted output sequence, which contains a total of 158 different extended ASCII code characters if calculated in bytes (an 8-bit binary system).

(5) C_old represents a ciphertext obtained by an original stream cipher method based on an exclusive-or operation, which contains a total of 16 different extended ASCII code characters if calculated in bytes (an 8-bit binary system).

(6) An overall level of a number of binary codes of different ciphertexts obtained by the method of the present disclosure is higher than that of the original stream cipher method based on the exclusive-or operation, which means that code distribution of the ciphertext obtained by the method of the present disclosure is more uniform.

A formula for calculating a uniformity λ of symbol distribution in a file is as follows:

$$\lambda = \sum_{i=1}^{r}\left(\alpha_i - \frac{n}{r}\right)^2 \quad \text{(formula 1)}$$

wherein:

(a) $\alpha_i$ represents a number of times of appearance of an $i^{th}$ symbol in the file;
(b) n represents a total number of symbols in the file;
(c) a total number r of the extended ASCII codes is 256;
(d) n/r represents an expected value of various symbols uniformly appearing in all 256 codes; and
(e) the smaller the value of λ, is, the more uniform the distribution of the symbols is.

After calculation, a value range of λ in the example is [0, 65280]; a uniformity λ of the ciphertext C is calculated to be 264; and a uniformity λ of the ciphertext C_old is calculated to be 6912.

The above calculation results show that code distribution of the ciphertext encrypted by the method of the present disclosure is very uniform, and the uniformity is about 30 times higher than that of the traditional method.

(8) In order to test an influence of a number of groups on the code uniformity, 41 grouping experiments are conducted, and comparison results of the code uniformity are shown in Table 1. A main difference between the method 1 and a method 2 lies in different rules applied by the key stream generator. The rule applied by the key stream generator in the method 1 is to negate the binary bits meeting a formula of (j+X) MOD Y=Z in the initial key stream, and X, Y and Z are 0, 3 and 0 respectively in the example. The rule applied by the key stream generator in the method 2 is to negate the binary bits meeting a formula of $(j+X_1)$ MOD Y1=Z1 or $(j+X_2)$ MOD Y2=Z2 in the initial key stream, and values of $X_1$, $Y_1$, $Z_1$, $X_2$, $Y_2$ and $Z_2$ in the example are 0, 3, 0, 0, 7 and 0, wherein j is called "bit order", which is a serial number of the binary bit of the key stream, and starts from 0 in the example.

Table 1 below shows comparison of the code uniformity in a case of using grouping encryption.

Statistical analysis shows that the code uniformity of the ciphertext file encrypted by the method of the present disclosure is better than that of the traditional method (the greater the value is, the lower the code uniformity is). When the numbers of groups are 1, 2, 3, 4, 8, 16, 32, 64, 128, 256 and 512 in the method 1, and when the numbers of groups are 128, 256, 512 and 1024 in the method 2, the code uniformity is slightly lower, but the code uniformity is still higher than that of the traditional method. The main reason lies in different key stream generators, and it is a safe choice to allow the number of groups to be a prime number.

$K=\{\text{"1234"}\}=\{0X31,0X32,0X33, 0X34\}_{16}=\{00110001,00110010,00110011, 00110100\}_2.$ $K'=\{0XA3,0X7B,0X17,0XA6\}_{16}=\{10100011, 01111011,00010111,10100110\}_2.$ $C=\{\text{"→}\blacksquare k\blacksquare\text{"}\}=\{0X1A,0XC2,0X6B, 0XDC\}_{16}=\{00011010,11000010,01101011, 11011100\}_2.$ $M'=\{0X3D,0XE5,0X89,0X38\}_{16}=\{00111101, 11100101,10001001,00111000\}_2.$

TABLE 1

Comparison of code uniformity in a case of using grouping encryption

| Number of groups | Code uniformity in method 1 in the text | Number of character codes of ciphertext in method 1 in the text | Code uniformity in method 2 in the text | Number of character codes of ciphertext in method 2 in the text | Code uniformity in traditional method | Number of character codes of ciphertext in traditional method |
|---|---|---|---|---|---|---|
| 1 | 1442 | 43 | 238 | 159 | 6912 | 16 |
| 2 | 800 | 75 | 298 | 159 | 6912 | 16 |
| 3 | 470 | 115 | 296 | 158 | 6912 | 16 |
| 4 | 658 | 102 | 252 | 159 | 6912 | 16 |
| 5 | 352 | 151 | 246 | 164 | 6912 | 16 |
| 6 | 288 | 154 | 258 | 164 | 6912 | 16 |
| 7 | 282 | 158 | 298 | 153 | 6912 | 16 |
| 8 | 788 | 75 | 216 | 170 | 6912 | 16 |
| 9 | 270 | 162 | 278 | 160 | 6912 | 16 |
| 10 | 286 | 163 | 236 | 164 | 6912 | 16 |
| 11 | 270 | 161 | 264 | 155 | 6912 | 16 |
| 12 | 316 | 151 | 298 | 161 | 6912 | 16 |
| 13 | 312 | 151 | 250 | 165 | 6912 | 16 |
| 14 | 308 | 153 | 302 | 155 | 6912 | 16 |
| 15 | 314 | 152 | 250 | 162 | 6912 | 16 |
| 16 | 1652 | 42 | 282 | 156 | 6912 | 16 |
| 17 | 390 | 142 | 294 | 155 | 6912 | 16 |
| 18 | 274 | 151 | 262 | 158 | 6912 | 16 |
| 19 | 270 | 160 | 274 | 161 | 6912 | 16 |
| 20 | 314 | 148 | 254 | 162 | 6912 | 16 |
| 21 | 294 | 152 | 306 | 152 | 6912 | 16 |
| 22 | 304 | 156 | 268 | 152 | 6912 | 16 |
| 23 | 272 | 160 | 286 | 154 | 6912 | 16 |
| 24 | 270 | 159 | 280 | 159 | 6912 | 16 |
| 25 | 308 | 155 | 258 | 163 | 6912 | 16 |
| 26 | 288 | 161 | 318 | 157 | 6912 | 16 |
| 27 | 286 | 161 | 256 | 161 | 6912 | 16 |
| 28 | 268 | 157 | 278 | 154 | 6912 | 16 |
| 29 | 284 | 155 | 248 | 166 | 6912 | 16 |
| 30 | 370 | 148 | 282 | 155 | 6912 | 16 |
| 31 | 334 | 152 | 274 | 157 | 6912 | 16 |
| 32 | 1270 | 45 | 308 | 149 | 6912 | 16 |
| 33 | 298 | 154 | 242 | 163 | 6912 | 16 |
| 34 | 384 | 144 | 266 | 163 | 6912 | 16 |
| 35 | 302 | 158 | 310 | 153 | 6912 | 16 |
| 36 | 408 | 145 | 246 | 164 | 6912 | 16 |
| 64 | 1562 | 41 | 336 | 155 | 6912 | 16 |
| 128 | 2332 | 35 | 446 | 134 | 6912 | 16 |
| 256 | 3478 | 28 | 1488 | 74 | 6912 | 16 |
| 512 | 2762 | 31 | 1264 | 80 | 6912 | 16 |
| 1024 | 2460 | 34 | 596 | 130 | 6912 | 16 |

III. Decryption Example

Figure 10:
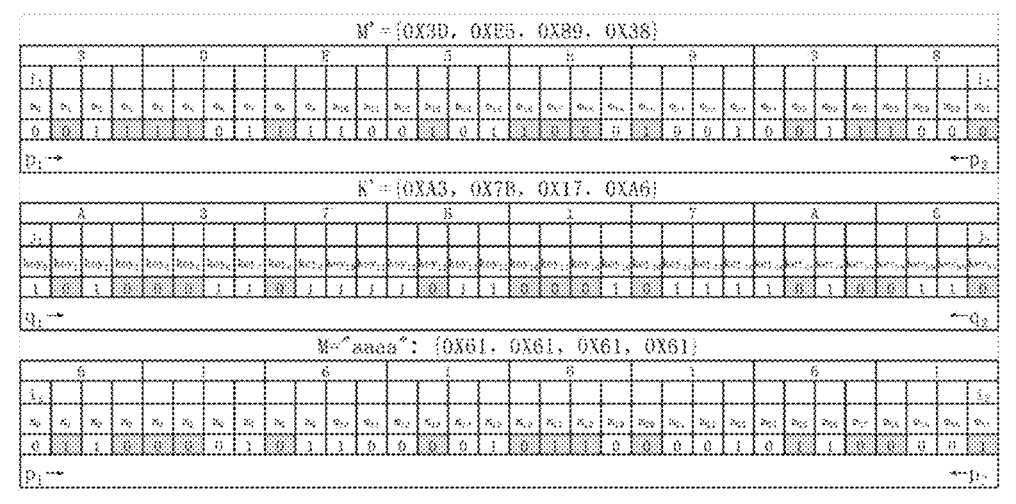

Decryption is an inverse operation of an encryption process. By scanning the key stream and the ciphertext stream, a storage address of each binary bit of the ciphertext in a plaintext space is calculated and then mapped to the plaintext space to obtain the plaintext M. A decryption process of the ciphertext obtained in Example 1 is shown in FIG. 2, FIG. 9, and FIG. 10.

$M=\{\text{"aaaa"}\}=\{0X61,0X61,0X61, 0X61\}_{16}=\{01100001,01100001,01100001, 01100001\}_2.$ Note:

1. $C=\{\text{→}\blacksquare k\blacksquare\}$ represents a ciphertext, and is an input sequence for decryption. {0X1A, 0XC2, 0X6B, 0XDC} is an extended ASCII code (a hexadecimal system) of the ciphertext "→■k■", which is converted into a binary system to obtain {00011010, 11000010, 01101011, 11011100}$_2$.

2. K={"1234"} represents an initial key. {0X31, 0X32, 0X33, 0X34} is an extended ASCII code of the initial key "1234", which is converted into a binary system to obtain {00110001, 00110010, 00110011, 00110100}$_2$.

3. K' represents a final key obtained after bit transformation of a specific bit of the initial key K. {0XA3, 0X7B, 0X17, 0XA6} is an extended ASCII code (a hexadecimal system) of the key, which is converted into a binary system to obtain {10100011, 01111011, 00010111, 10100110}$_2$.

4. M' represents a pseudo-plaintext sequence obtained from the ciphertext C according to the bit permutation rule. {0X3D, 0XE5, 0X89, 0X38} is an extended ASCII code (a hexadecimal system) of M', which is converted into a binary system to obtain {00111101, 11100101, 10001001, 00111000}$_2$.

5. M={"aaaa"} represents a plaintext, and is a decrypted output sequence. {0X61, 0X61, 0X61, 0X61} is an extended ASCII code (a hexadecimal system) of the plaintext "aaaa", which is converted into a binary system to obtain {01100001, 01100001, 01100001, 01100001}.

6. The ciphertext, the key, and the plaintext all use a logical structure of a round-robin queue, which may be calculated at any position in the queue, and initial values are now taken as i=0, j=0, $k_1$=0 and $k_2$=31. A working pointer p points to a plaintext M[0], q points to a key K[0], and $r_1$ and $r_2$ point to ciphertexts C[0] and C[31]. A decryption process is shown in FIG. 9, and FIG. 10.

7. In the example, the bit transformation rule applied to the initial key stream is to negate the binary bits meeting a formula of (j+X) MOD Y=Z in the initial key stream, wherein j is called "bit order", which is a serial number of the binary bit of the key stream, and starts from 0 in the example. X, Y and Z are integers determined in advance, which are 0, 3 and 0 respectively in the example. In FIG. 2, gray shading parts of the initial key K represent specific bits meeting the above formula.

8. In the example, the bit permutation rule applied to the ciphertext is to bidirectionally scan corresponding bits of the ciphertext C, the key stream K', and the pseudo-plaintext space M' at the same time, and $i_1$ and $i_2$, $j_1$ and $j_2$, as well as $k_1$ and $k_2$ move in an opposite direction at the same time. In a scanning process in a first pass, when K'[$j_1$] and K'[$j_2$] are both false values, C[$k_1$] and C[$k_2$] are exchanged and then stored in M'[$i_1$] and M'[$i_2$]. In a scanning process in a second pass, when K'[$j_1$] and K'[$j_2$] are both true values, C[$k_1$] and C[$k_2$] are exchanged and then stored in M'[$i_1$] and M'[$i_2$], and the finally obtained pseudo-plaintext M' is shown in FIG. 9.

9. In the example, the bit transformation rule applied to the pseudo-plaintext M' is to negate according to the specific bits of the key K' bit by bit, which are "false" value binary bits in the example. Gray shading parts in the pseudo-plaintext M' represent pseudo-plaintexts corresponding to "false" value parts of the key K', and gray shading parts in the plaintext M are results of negating the gray shading parts in the pseudo-plaintext M' bit by bit. The finally obtained plaintext M is shown in FIG. 10.

IV. Specific Embodiments of the Present Disclosure

The specific embodiments of the patent application are introduced in three parts: 1. design of bit transformation rules, 2. design of bit permutation rules, and 3. specific embodiments of encryption and decryption method.

1. Design of Bit Transformation Rules

The bit transformation rules may be designed with the help of a mathematical formula, with the help of a pseudo-random sequence and various chaotic signals generated by various key stream generators, or with the help of a random file with uniform code distribution on a binary system.

Effects of Bit Transformation Rules:

(1) distribution of "1" and "0" in a binary code is randomly changed; and (2) a problem of too many 0 or 1 (i.e., too many bytes like 0X00 or 0XFF) in a binary code of the plaintext and the key, which leads to a problem of encryption failure or easy decryption, can be solved by negating partial binary bits of the plaintext and the key.

Rule 1: a binary bit meeting a certain formula is negated.

For example, the key stream generator in Example 1 and Example 2 is an application of a Boolean function F(j)=(C+X×j) MOD Y==Z; and the key stream generator in Example 3 is a mixed application of the above Boolean function, which is namely F(j)=$F_1$(j)||$F_2$(j), with an effect better than that in Example 1 and Example 2. "MOD" represents a remainder operation, and "==" represents an equality judgment operation. "||" represents a logical operation or; C, X, Y and Z are integers determined in advance, and Y should be a prime number, wherein j is called "bit order", which is a serial number of the binary bit of the key stream. Since the plaintext, the key, and the ciphertext all use a round-robin queue structure, a starting value of j may be any legal position of the key stream.

Rule 2: negation is performed according to a true value bit or a false value bit of the key stream.

For example, a double key stream is used, and according to a true value bit or a false value bit of the other key stream, corresponding bits of the initial key stream are negated, so that the key stream generator is constructed.

For another example, according to the true value bit or the false value bit of the key stream, corresponding bits of the plaintext are negated, such as bit transformation parts of the plaintext in Example 1, Example 2, and Example 3.

2. Design of Bit Permutation Rules

An effect of the bit permutation rules is to randomly permute a binary bit meeting a condition according to the permutation rule depending on the key stream, so that an arrangement order of binary codes of a pseudo-plaintext sequence is disturbed.

Rule 1: scanning is performed in two passes, wherein the corresponding bit of the plaintext is permuted according to the false value bit of the key stream in the first pass, and the corresponding bit of the plaintext is permuted according to the true value bit of the key stream in the second pass.

For example, the bit permutation parts of the plaintext in Example 1, Example 2, and Example 3 are implemented by a method as follows.

(1) Double-ended pointers "low" and "high" are set in each group, wherein values of the pointers may be any legal positions of a round-robin queue composed of a binary stream of a plaintext and a key, and an initial distance between the pointers is required to be a length of the binary stream of the plaintext and the key.

(2) The plaintext and the key are scanned in the first pass, the low and high pointers move in an opposite direction, and when both the low and high pointers point to a false value bit of the key stream, the bit value of the plaintext is permuted.

(3) The double-ended pointers "low" and "high" in the group are reset, so that the two pointers move in an opposite direction, the values of the two pointers are capable of being any legal positions of the round-robin queue composed of the binary stream of the plaintext and the key, and the distance between the two pointers is required to be the length of the binary stream of the plaintext and the key.

(4) The plaintext and the key are scanned in the second pass, the low and high pointers move in an opposite direction, and when both the low and high pointers point to a true value bit of the key stream, the bit value of the plaintext is permuted.

Rule 2: scanning is performed in one pass, wherein the corresponding bit of the plaintext is permuted according to the false value bit and the true value bit of the key stream.

(1) Double-ended pointers "low" and "high" are set in each group, and the two pointers move in a same direction, wherein values of the two pointers may be any legal positions of a round-robin queue composed of a binary stream of a plaintext and a key, and an initial distance between the two pointers is not required.

(2) The plaintext and the key are only scanned in one pass, the low and high pointers move, when the low pointer points to a false bit of the key stream and the high pointer points to a true bit of the key stream, the bit value of the plaintext is permuted, and when one of the pointers already walks around the round-robin queue of the plaintext or the key, the scanning is ended.

Rule 3: scanning is performed in one pass, wherein the corresponding bit of the plaintext is permuted according to the true value bit and the false value bit of the key stream.

(1) Double-ended pointers "low" and "high" are set in each group, and the two pointers move in an opposite direction, wherein values of the two pointers may be any legal positions of a round-robin queue composed of a binary stream of a plaintext and a key, and an initial distance between the two pointers is not required.

(2) The plaintext and the key are only scanned in one pass, the low and high pointers move, when the low pointer points to a true bit of the key stream and the high pointer points to a false bit of the key stream, the bit value of the plaintext is permuted, and when one of the pointers already walks around the round-robin queue of the plaintext or the key, the scanning is ended.

3. Specific Algorithm Implementation of Encryption and Decryption Method

An encryption and decryption method set is designed on the basis of a combination of a bit transformation rule set and a bit permutation rule set, and designs and combination methods of the sets are flexible and diverse. Taking the encryption and decryption method applied in Example 3 as an example, an algorithm design process of the method is described.

3.1 Encryption Algorithm Implementation Process

1. The plaintext file and the initial key file in Example 3 are read in.

The plaintext is:
{"aaaaaaaaaaaaaaaaaaaaaaaaaaaaaaaaaaaaaaaaaaaa-
aaaaaaaaaaaaaaaaaaaaaaaaaaaaaaaaaaa
aaaaaaaaaaaaaaaaaaaaaaaaaaaaaaaaaaaaaaaaaaaa-
aaaaaaaaaaaaaaaaaaaaaaaaaaaaaaaaaaa
aaaaaaaaaaaaaaaaaaaaaaaaaaaaaaaaaaaaaaaaaaaa-
aaaaaaaaaaaaaaaaaaaaaaaaaaaaaaaaaa aaaaaa"}

The initial key stream is:
{"我爱你中国!!!"}

2. A character pointer is established
dynamic pointer of plaintext string array: char *M;
dynamic pointer of key string array: char *K;
dynamic pointer of ciphertext string array: char *C.

3. The plaintext file M is opened, and a number of bytes of the plaintext file M is counted and stored in M_bytes.

4. A storage space is allocated
plaintext storage space M=new char[M_bytes+1];
key storage space K=new char[M_bytes+1];
ciphertext storage space C=new char[M_bytes+1].

5. Contents of the plaintext file are read into a storage space pointed by the pointer M.

6. Contents of the key file are read into a storage space pointed by the pointer K, wherein the initial key stream "我爱你中国" has a length much smaller than that of the plaintext stream, which is stored in the key space K by circular filling.

7. A function int read_bit(char *p_str, int n) is established to read an $n^{th}$ binary bit of a character string function parameter: p_str is a pointer pointing to the character string, and the parameter n represents a binary bit with a subscript n;

function effect: values (0, 1) of the $n^{th}$ bit in the character string pointed by p are found and returned;

function return value: values (0, 1) of the $n^{th}$ bit in the character string pointed by p are returned.

8. A function void write_bit_1(char *p_str, int n) is established to write 1 to the $n^{th}$ bit in the character string function parameter: p_str is a pointer pointing to the character string, and the parameter n represents a binary bit with a subscript n;

function effect: the $n^{th}$ bit in the character string pointed by p_str is written with 1;

function return value: null;

sequence of key statement:

```
byte=n/8, bit=n%8;
p_str+=byte;
ch=*p_str;
switch(bit){
    case 0: {ch=ch|0x80; break;}
    case 1: {ch=ch|0x40; break;}
    case 2: {ch=ch|0x20; break;}
    case 3: {ch=ch|0x10; break;}
    case 4: {ch=ch|0x08;break;}
    case 5: {ch=ch|0x04;break;}
    case 6: {ch=ch|0x02;break;}
    case 7: {ch=ch|0x01;break;}
}
*p_str=ch;
```

9. A function void write_bit_0(char *p_str, int n) is established to write 0 to the $n^{th}$ bit in the character string function parameter: p_str is a pointer pointing to the character string, and the parameter n represents a binary bit with a subscript n;

function effect: the $n^{th}$ bit in the character string pointed by p_str is written with 0;

function return value: null;

sequence of key statement:

```
byte=n/8, bit=n%8;
p_str+=byte;
ch=*p_str;
switch(bit){
    case 0: {ch=ch&0x7f; break;}
    case 1: {ch=ch&0xbf; break;}
    case 2: {ch=ch&0xdf; break;}
    case 3: {ch=ch&0xef; break;}
    case 4: {ch=ch&0xf7; break;}
    case 5: {ch=ch&0xfb; break;}
    case 6: {ch=ch&0xfd; break;}
    case 7: {ch=ch&0xfe; break;}
}
*p_str=ch;
```

10. A function void en_bit_transfor( ) is established to complete the bit transformations of the initial key stream and the plaintext stream function parameter: none;
function effect: the bit transformations of the initial key stream and the plaintext stream are completed at the same time to obtain the key stream K' and the pseudo-plaintext stream M';
function return value: none;
sequence of key statement:

```
For(i=0; i<8*M_bytes; i++){
  K_bit=read_one_bit(K, i);
  if(Z1==( C1+X1*i)%Y1 || Z2==( C2+X2* i)%Y2){
    if(1==K_bit){
      write_one_bit_0(K, i);
      K_bit=0;
    }
    else{
      write_one_bit_1(K, i);
      K_bit=1;
    }
  }
  if(0 == K_bit){
    if(1 == read_one_bit(M, i))
      write_one_bit_0(M, i);
    else
      write_one_bit_1(M, i);
  }
}
```

11. A function void en_bit_replace(int low, int high) is established to complete bit permutation of a pseudo-plaintext stream in a group
function parameter: low and high serve as double-ended pointers and point to two ends of a group;
function effect: the pseudo-plaintext stream in the group is subjected to bit permutation to obtain a ciphertext of the group;
function return value: none;
sequence of key statement:

```
// permutation in first pass
head=low;
tail=high;
while(head <= tail) {
  while(1 == read_one_bit(K, head)) head++;
  while(1 == read_one_bit(K, tail)) tail--;
  M_head_bit = read_one_bit(M, head);
  M_tail_bit = read_one_bit(M, tail);
  if(head <= tail){
    if(M_head_bit != M_tail_bit){
      if(1 == M_head_bit)write_one_bit_0(C, head);
      else write_one_bit_1(C, head);
      if(1 == M_tail_bit)write_one_bit_0(C, tail);
      else write_one_bit_1(C, tail);
    }
    else{
      if(1 == M_head_bit){
        write_one_bit_1(C, head);
        write_one_bit_1(C, tail);
      }
      else{
        write_one_bit_0(C, head);
        write_one_bit_0(C, tail);
      }
    }
  }
  head++; tail--;
}
// permutation in second pass
head=low;
tail=high;
while(head <= tail){
  while(0 == read_one_bit(K, head)) head++;
  while(0 == read_one_bit(K, tail)) tail--;
  M_head_bit = read_one_bit(M, head);
  M_tail_bit = read_one_bit(M, tail);
  if(head <= tail){
    if(M_head_bit != M_tail_bit){
      if(1 == M_head_bit)write_one_bit_0(C, head);
      else write_one_bit_1(C, head);
      if(1 == M_tail_bit)write_one_bit_0(C, tail);
      else write_one_bit_1(C, tail);
    }
    else{
      if(1 == M_head_bit){
        write_one_bit_1(C, head);
        write_one_bit_1(C, tail);
      }
      else{
        write_one_bit_0(C, head);
        write_one_bit_0(C, tail);
      }
    }
  }
  head++; tail--;
}
```

12. A function void encrypt( ) is established to complete encryption
function parameter: none;
function effect: an en_bit_transfor function and an en_bit_replace function are called, and the encryption is completed by a grouping permutation method;
function return value: none;
sequence of key statement:

```
en_bit_transfor( );
group_num=11;
for(j = 0; j < 8*M_bytes; j += floor(8*M_bytes*1.0/group_num)){
  k = j + 8*M_bytes/group_num;
  if(k > 8*M_bytes) k = 8*M_bytes;
  en_bit_replace(j, k-1);
}
```

13. A function void statisticalAnalysis( ) is established to analyze a code uniformity
function parameter: none;
function effect: times of appearance of each character code (in bytes) are counted, and then a code uniformity is calculated;
function return value: null;
sequence of key statement:

```
radix=256;
lambda=0, max_lam=0;
for(i=0; i<M_bytes; i++){
  ascii[C[i]&0x000000ff]++;
}
for(i=0; i<radix; i++){
  lambda+=pow(ascii[1]-(M_bytes*1.0/radix), 2);
}
max_lam+=pow(M_bytes-(M_bytes*1.0/radix), 2);
for(i=0; i<radix-1; i++){
  max_lam+=pow(0-(M_bytes*1.0/radix), 2);
}
``` wherein when calculated in bytes, a total number of different symbols (codes) "radix" is 256, lambda is a code uniformity of a ciphertext obtained through calculation by the method, and max_lam is a maximum value of the code uniformity.

14. A ciphertext array C obtained by calculating an encrypt ( ) function is written into the ciphertext file and saved.

3.2 Decryption Algorithm Implementation Process

1. The ciphertext file and the initial key file in Example 3 are read in.

The ciphertext file C is:

[garbled ciphertext characters]

The key file K' is:

{"我爱你中国!!!"}

2. A character pointer is established dynamic pointer of plaintext string array: char *M_decrypt;

dynamic pointer of key string array: char *K;

dynamic pointer of ciphertext string array: char *C.

3. The ciphertext file C is opened, and a number of bytes of the ciphertext file C is counted and stored in C_bytes.

4. A storage space is allocated decrypted plaintext storage space M_decrypt=new char[C_bytes+1];

key storage space K=new char[C_bytes+1];

ciphertext storage space C=new char[C_bytes+1].

5. Contents of the ciphertext file are read into a storage space pointed by the pointer C and the pointer M_decrypt, that is, an initial value of the plaintext stream is the ciphertext.

6. Contents of the key file are read into a storage space pointed by the pointer K, wherein the initial key stream is "我爱你中国!!!".

7. A function int read_bit(char *p_str,int n) is established to read an $n^{th}$ binary bit of a character string function parameter: p_str is a pointer pointing to the character string, and the parameter n represents a binary bit with a subscript n;

function effect: values (0, 1) of the $n^{th}$ bit in the character string pointed by p are found and returned;

function return value: values (0, 1) of the $n^{th}$ bit in the character string pointed by p are returned.

8. A function void write_bit_1(char *p_str,int n) is established to write 1 to the $n^{th}$ bit in the character string function parameter: p_str is a pointer pointing to the character string, and the parameter n represents a binary bit with a subscript n;

function effect: the $n^{th}$ bit in the character string pointed by p_str is written with 1;

function return value: null;

sequence of key statement: the same as the void write_bit_1 function in the encryption process, which will not be repeated.

9. A function void write_bit_0(char *p_str,int n) is established to write 0 to the $n^{th}$ bit in the character string function parameter: p_str is a pointer pointing to the character string, and the parameter n represents a binary bit with a subscript n;

function effect: the $n^{th}$ bit in the character string pointed by p_str is written with 0;

function return value: null;

sequence of key statement: the same as the void write_bit_0 function in the encryption process, which will not be repeated.

10. A function void de_bit_transfor( ) is established to complete the bit transformations of the key stream and the ciphertext stream, with an implementation process the same as that of the bit transformations in the encryption process.

function parameter: none;

function effect: the bit transformations of the key stream K' and the ciphertext stream (stored in M_decrypt) are completed at the same time;

function return value: none;

sequence of key statement:

```
for (i=0; i<8*M_bytes; i++){
   K_bit=read_one_bit(K, i);
   if(Z1==( C1+X1*i)%Y1 || Z2==( C2+X2* i)%Y2){
      if(1==K_bit){
         write_one_bit_0(K, i);
         K_bit=0;
      }
      else{
         write_one_bit_1(K, i);
         K_bit=1;
      }
   }
   if (0 == K_bit){
   if (1 == read_one_bit(M_decrypt, i))
      write_one_bit_0(M_decrypt, i);
   else
      write_one_bit_1(M_decrypt, i);
   }
}
```

11. A function void de_bit_replace(int low, int high) is established to complete bit permutation of a ciphertext stream in a group.

function parameter: low and high serving as double-ended pointers and pointing to two ends of a group;

function effect: the ciphertext stream in the group is subjected to bit permutation to obtain a plaintext of the group;

function return value: none;

sequence of key statement:

```
// permutation in first pass
head=low;
tail=high;
while(head <= tail){
   while(1 == read_one_bit(K, head)) head++;
   while(1 == read_one_bit(K, tail)) tail--;
   C_head_bit = read_one_bit(C, head);
   C_tail_bit = read_one_bit(C, tail);
   if(head <= tail){
      if(C_head_bit != C_tail_bit){
         if(1 == C_head_bit)write_one_bit_0(M_decrypt, head);
         else write_one_bit_1(M_decrypt, head);
         if(1 == C_tail_bit)write_one_bit_0(M_decrypt, tail);
         else write_one_bit_1(M_decrypt, tail);
      }
      else{
         if( 1 == C_head_bit){
            write_one_bit_1(M_decrypt, head);
            write_one_bit_1(M_decrypt, tail);
         }
         else{
            write_one_bit_0(M_decrypt, head);
            write_one_bit_0(M_decrypt, tail);
         }
      }
   }
   head++; tail--;
}
// permutation in second pass
head=low;
tail=high;
while(head <= tail) {
   while(0 == read_one_bit(K, head)) head++;
   while(0 == read_one_bit(K, tail)) tail--;
   C_head_bit = read_one_bit(C, head);
   C_tail_bit = read_one_bit(C, tail);
```

-continued

```
if(head <= tail){
    if(C_head_bit != C_tail_bit){
        if(1 == C_head_bit)write_one_bit_0(M_decrypt, head);
        else write_one_bit_1(M_decrypt, head);
        if(1 == C_tail_bit)write_one_bit_0(M_decrypt, tail);
        else write_one_bit_1(M_decrypt, tail);
    }
    else{
        if(1 == C_head_bit){
            write_one_bit_1(M_decrypt, head);
            write_one_bit_1(M_decrypt, tail);
        }
        else{
            write_one_bit_0(M_decrypt, head);
            write_one_bit_0(M_decrypt, tail);
        }
    }
}
head++; tail--;
}
```

12. A function void decrypt( ) is established to complete decryption
  function parameter: none
  function effect: a de_bit_transfor function and a de_b-it_replace function are called, and the decryption is completed by a grouping permutation method;
  function return value: none;
  sequence of key statement:

```
group_num=11;
for(j = 0; j< 8*M_bytes; j += floor(8*M_bytes*1.0/group_num)){
    k=j+8*M_bytes/group_num;
    if(k>8*M_bytes)k=8*M_bytes;
    De_bit_replace(j, k-1);
}
de_bit_transfor( );
```

13. A plaintext array M_decrypt obtained by calculating a decrypt( ) function is written into the plaintext file and saved as follows.

| Plaintext of Decryption(M): |
| --- |
| aaaaaaaaaaaaaaaaaaaaaaaaaaaaaaaaaaaaaaaaaaaaaaaaaaaaaaaaaaaaaaaa |
| aaaaaaaaaaaaaaaaaaaaaaaaaaaaaaaaaaaaaaaaaaaaaaaaaaaaaaaaaaaa |
| aaaaaaaaaaaaaaaaaaaaaaaaaaaaaaaaaaaaaaaaaaaaaaaaaaaaaaaaaaaa |
| aaaaaaaaaaaaaaaa |

To summarize the above embodiments, the solution of the present disclosure is mainly different from a traditional stream cipher encryption technology in that the method does not depend on an exclusive-or operation, but is based on permutation and transformation operations on a binary bit stream of a plaintext, without a strict requirement on a uniformity of a key stream. The main principle of the technical solution of the present disclosure are summarized as follows.

(1) An existing known coding sequence (which may be called a true random sequence) is used as an initial key stream. The initial key stream may come from various types of files, such as a text file, an audio, a video, a picture, and the like, and may also come from a pseudo-random sequence and various chaotic signals generated by various key stream generators, which means that a code uniformity of the initial key stream on a binary system has little influence on the algorithm. On a premise of the existing technology, when a key length is 128 bits, it is almost impossible to search for a key on a computer by an exhaustive method (a brute-force method).

(2) A bit operation rule set is designed. Firstly, a bit value of the initial key stream is changed according to the bit operation rule, so as to obtain the key stream. Then, a bit value of the plaintext is changed according to the bit operation rule depending on the key stream.

(3) A permutation rule set is designed. On the basis of the bit-transformed plaintext stream obtained, according to the permutation rule depending on the key stream, the permuted and transformed plaintext stream is randomly distributed in the ciphertext stream, so as to obtain the ciphertext.

There is no byte correspondence between the plaintext set M and the ciphertext set C in the method of the present disclosure, but there is a correspondence in a binary bit, and a bit correspondence is based on the permutation rule and the bit transformation rule generated by the key set K. Therefore, in order to decrypt a file encrypted by the method, four necessary and sufficient conditions must be met:
  (1) known key set;
  (2) known bit permutation rule set for decryption;
  (3) known bit transformation rule set for decryption; and
  (4) known ciphertext file.

However, it is impossible to obtain the above four conditions at the same time, and experimental results prove that the method of the present disclosure is simple and practicable, and has a high security.

In addition, the technical solution in the previous patent for disclosure to the applicant in the aspect of stream cipher is based on a hash function. An existing problem is that in the hash function, only positions of "0" and "1" in the plaintext can be changed and mapped to the ciphertext space. When the code distribution of the plaintext or the key is biased towards all "0" or all "1" on a binary system (that is, when there are too many bytes like 0X00 or 0XFF), there is a situation of encryption failure or being easily attacked. However, introduction of the bit operation rule set in the new method proposed herein can perfectly solve the above situation, so that there is no correspondence between the numbers "0" and "1" in the plaintext and the ciphertext, and even if a special plaintext is transmitted by the method, the special plaintext is not easy to be decrypted. Moreover, by using the bit permutation and bit transformation rules, the code uniformity of the ciphertext is much higher than that of the plaintext, and is also higher than that of traditional stream cipher encryption.

It should be recognized that the method steps in the embodiments of the present disclosure may be realized or implemented by computer hardware, a combination of hardware and software, or a computer instruction stored in a non-transitory computer readable memory. A standard programming technology may be used in the method. Each program may be implemented by an advanced process or an object-oriented programming language to communicate with a computer system. However, if necessary, the program may be implemented by an assembly or machine language.

In any case, the language may be a compiled or interpreted language. In addition, the program may run on a programmed application-specific integrated circuit for this purpose.

In addition, process operations described herein may be performed in any suitable order, unless otherwise indicated herein or otherwise clearly contradicted by context. The processes (or variations and/or combinations) described herein may be executed under the control of one or more computer systems configured with executable instructions, and may be implemented as codes (such as executable instructions, one or more computer programs, or one or more applications) commonly executed on one or more processors by hardware, or a combination thereof. The computer program includes a plurality of instructions executable by one or more processors.

Further, the method may be implemented in any type of suitable computing platform operatively connected, including but not limited to a personal computer, a mini computer, a main framework, a workstation, a network or a distributed computing environment, a separate or integrated computer platform, or communication with a charged particle tool or other imaging devices. All aspects of the present disclosure may be implemented by a machine-readable code stored in a non-transitory storage medium or device, whether the code is moved or integrated into the computing platform, such as a hard disk, an optical read and/or write storage medium, a RAM, a ROM, and the like, so that the code may be read by a programmable computer. When read by a computer, the storage medium or device may be used to configure and operate the computer to execute the processes described herein. In addition, the machine-readable code, or a part of the machine-readable code may be transmitted through a wired or wireless network. When such medium includes instructions or programs that implement the steps described above in combination with a microprocessor or other data processors, the disclosure described herein includes these and other different types of non-transitory computer-readable storage media. In a case of programming according to the method and technology of the present disclosure, the present disclosure further includes the computer itself.

A computer program can be applied to input data to execute the functions described herein, thus converting the input data to generate output data stored in a nonvolatile memory. Output information may also be applied to one or more output devices such as a display. In a preferred embodiment of the present disclosure, the converted data represents a physical and tangible object, including a specific visual depiction of the physical and tangible object generated on the display.

The foregoing is only the preferred embodiments of the present disclosure, and the present disclosure is not limited to the above embodiments. As long as it achieves the technical effect of the present disclosure by the same means, it should fall within the scope of protection of the present disclosure. Any modifications, equivalent substitutions, improvements, and the like made within the gist and principle of the present disclosure shall be included in the scope of protection of the present disclosure. The technical solution and/or implementation may have various modifications and changes in the scope of protection of the present disclosure.

What is claimed is:

1. An encryption and decryption method based on bit permutation and bit transformation, comprising the following steps of:

S1: configuring a memory space, and preparing corresponding storage spaces for a plaintext file, a ciphertext file, and a key file, wherein an initial key file comes from a known coding sequence and serves as a shared file for encryption and decryption;

S2: changing a bit value of an initial key stream according to a bit operation rule, so as to obtain a bit-transformed key stream, and then changing a bit value of a plaintext according to the bit operation rule depending on the key stream; and S3: on the basis of a bit-transformed plaintext stream, according to a bit permutation rule depending on the key stream, performing a bit permutation operation on the bit-transformed plaintext stream, and randomly distributing the plaintext stream in a ciphertext stream, so as to obtain a target ciphertext and store the target ciphertext as a file.

2. The method of claim 1, wherein the step S1 comprises: initializing the plaintext file, loading the plaintext file needing to be encrypted, and setting a number of code elements for the key file, wherein a byte length of the key file is capable of being customized, and the coding sequence for the initial key file comes from at least one of a text file, an audio, a video, a picture, an image, a graph, a pseudo-random code, or a chaotic value.

3. The method of claim 1, wherein the step S2 comprises: by means of a pseudo-random sequence and various chaotic signals generated by various key stream generators, or by means of a random file with uniform code distribution on a binary system, providing a bit transformation operation rule.

4. The method of claim 1, wherein in the step S2, the bit operation rule comprises at least one of the following operation rules:

rule 1: negating a binary bit meeting the following Boolean function:

$$F(j)=(C+X \times j) \text{MOD } Y==Z,$$

wherein C, X and Z are integers determined in advance, Y is a prime number, and j is a serial number of a binary bit of the key stream; "MOD" represents a remainder operation, and "==" represents an equality judgment operation; or rule 2: negating according to a true value bit or a false value bit of the key stream.

5. The method of claim 1, wherein the step S3 comprises: performing grouped bit permutation on the bit-transformed plaintext stream for one or more times; and/or performing grouped bit permutation on an initial ciphertext that is used as a parameter for one or more times; so as to obtain the ciphertext file after being encrypted for one or more times.

6. The method of claim 5, wherein in the step S3, the bit permutation operation comprises steps of:

S311: setting double-ended pointers in each group, wherein values of the two pointers are legal positions of a round-robin queue composed of a binary stream of a plaintext and a key, and an initial distance between the two pointers is configured to be a length of the binary stream of the plaintext and the key;

S312: scanning the plaintext and the key in a first pass, moving the first pointer and the second pointer in an opposite direction, and when both the first pointer and the second pointer point to a false value bit of the key stream, permuting the bit value of the plaintext;

S313: resetting the double-ended pointers in each group, so that the two pointers move in an opposite direction, the values of the two pointers are capable of being the legal positions of the round-robin queue composed of the binary stream of the plaintext and the key, and a reset distance between the pointers is the length of the binary stream of the plaintext and the key; and S314: scanning the plaintext and the key in a second pass, moving the first pointer and the second pointer in an opposite direction, and when both the first pointer and the second pointer point to a true value bit of the key stream, permuting the bit value of the plaintext.

7. The method of claim 5, wherein in the step S3, the bit permutation operation comprises steps of:

S321: setting double-ended pointers in each group and making the two pointers move in a same direction or in an opposite direction, wherein values of the two pointers are legal positions of a round-robin queue composed of a binary stream of a plaintext and a key, and an initial distance between the two pointers is not configured;

S322: scanning the plaintext and the key only in one pass, moving the first pointer and the second pointer, when the first pointer points to a false bit of the key stream and the second pointer points to a true bit of the key stream, permuting the bit value of the plaintext corresponding to the first pointer and the second pointer, and ending when one of the pointers already walks around the round-robin queue of the plaintext or the key; and S323: permuting the bit value of the plaintext at an ending position of the pointer.

8. The method of claim 1, further comprising:

respectively creating a plaintext encrypted random number, a ciphertext encrypted random number, and a key encrypted random number correspondingly for the plaintext file, the ciphertext file, and the key file, and generating corresponding working pointers according to values of the encrypted random numbers;

performing working pointer displacement reading on the plaintext file, the ciphertext file, and the key file; and circularly traversing the working pointer for a plurality of times, and according to a value of the binary bit of the key stream pointed by the working pointer, iterating the plaintext file for a plurality of times to obtain the ciphertext file.

9. A computer device, comprising a memory, a processor, and a computer program stored on the memory and executable on the processor, wherein the processor, when executing the program, implements an encryption and decryption method based on bit permutation and bit transformation, comprising the following steps of:

S1: configuring a memory space, and preparing corresponding storage spaces for a plaintext file, a ciphertext file, and a key file, wherein an initial key file comes from a known coding sequence and serves as a shared file for encryption and decryption;

S2: changing a bit value of an initial key stream, and then changing a bit value of a plaintext according to the bit operation rule depending on the key stream; and S3: on the basis of a bit-transformed plaintext stream, according to a bit permutation rule depending on the key stream, performing a bit permutation operation on the bit-transformed plaintext stream, and randomly distributing the plaintext stream in a ciphertext stream, so as to obtain a target ciphertext and store the target ciphertext as a file.

10. A non-transitory computer-readable storage medium storing a computer program that, when executed by a processor, implements an encryption and decryption method based on a bit permutation and bit transformation, comprising the following steps of:

S1: configuring a memory space, and preparing corresponding storage spaces for a plaintext file, a ciphertext file, and a key file, wherein an initial key file comes from a known coding sequence and serves as a shared file for encryption and decryption;

S2: changing a bit value of an initial key stream according to a bit operation rule, so as to obtain a bit-transformed key stream, and then changing a bit value of a plaintext according to the bit operation rule depending on the key stream; and S3: on the basis of a bit-transformed plaintext stream, according to a bit permutation rule depending on the key stream, performing a bit permutation operation on the bit-transformed plaintext stream, and randomly distributing the plaintext stream in a ciphertext stream, so as to obtain a target ciphertext and store the target ciphertext as a file.

11. The computer device of claim 9, wherein the step S1 comprises:

initializing the plaintext file, loading the plaintext file needing to be encrypted, and setting a number of code elements for the key file, wherein a byte length of the key file is capable of being customized, and the coding sequence for the initial key file comes from at least one of a text file, an audio, a video, a picture, an image, a graph, a pseudo-random code, or a chaotic value.

12. The computer device of claim 9, wherein the step S2 comprises:

by means of a pseudo-random sequence and various chaotic signals generated by various key stream generators, or by means of a random file with uniform code distribution on a binary system, providing a bit transformation operation rule.

13. The computer device of claim 9, wherein in the step S2, the bit operation rule comprises at least one of the following operation rules:

rule 1: negating a binary bit meeting the following Boolean function:

$$F(j)=(C+X\times j)\mathrm{MOD}\ Y==Z,$$

wherein C, X and Z are integers determined in advance, Y is a prime number, and j is a serial number of a binary bit of the key stream; "MOD" represents a remainder operation, and "==" represents an equality judgment operation; or rule 2: negating according to a true value bit or a false value bit of the key stream.

14. The computer device of claim 9, wherein the step S3 comprises:

performing grouped bit permutation on the bit-transformed plaintext stream for one or more times; and/or performing grouped bit permutation on an initial ciphertext that is used as a parameter for one or more times;

so as to obtain the ciphertext file after being encrypted for one or more times.

15. The computer device of claim 14, wherein in the step S3, the bit permutation operation comprises steps of:

S311: setting double-ended pointers in each group, wherein values of the two pointers are legal positions of a round-robin queue composed of a binary stream of a plaintext and a key, and an initial distance between the two pointers is configured to be a length of the binary stream of the plaintext and the key;

S312: scanning the plaintext and the key in a first pass, moving the first pointer and the second pointer in an opposite direction, and when both the first pointer and the second pointer point to a false value bit of the key stream, permuting the bit value of the plaintext;

S313: resetting the double-ended pointers in each group, so that the two pointers move in an opposite direction, the values of the two pointers are capable of being the legal positions of the round-robin queue composed of the binary stream of the plaintext and the key, and a reset distance between the pointers is the length of the binary stream of the plaintext and the key; and S314: scanning the plaintext and the key in a second pass, moving the first pointer and the second pointer in an opposite direction, and when both the first pointer and the second pointer point to a true value bit of the key stream, permuting the bit value of the plaintext.

16. The computer device of claim 14, wherein in the step S3, the bit permutation operation comprises steps of:

S321: setting double-ended pointers in each group and making the two pointers move in a same direction or in an opposite direction, wherein values of the two pointers are legal positions of a round-robin queue composed of a binary stream of a plaintext and a key, and an initial distance between the two pointers is not configured;

S322: scanning the plaintext and the key only in one pass, moving the first pointer and the second pointer, when the first pointer points to a false bit of the key stream and the second pointer points to a true bit of the key stream, permuting the bit value of the plaintext corresponding to the first pointer and the second pointer, and ending when one of the pointers already walks around the round-robin queue of the plaintext or the key; and S323: permuting the bit value of the plaintext at an ending position of the pointer.

17. The computer device of claim 9, wherein the method further comprises:

respectively creating a plaintext encrypted random number, a ciphertext encrypted random number, and a key encrypted random number correspondingly for the plaintext file, the ciphertext file, and the key file, and generating corresponding working pointers according to values of the encrypted random numbers;

performing working pointer displacement reading on the plaintext file, the ciphertext file, and the key file; and circularly traversing the working pointer for a plurality of times, and according to a value of the binary bit of the key stream pointed by the working pointer, iterating the plaintext file for a plurality of times to obtain the ciphertext file.

18. The computer-readable storage medium of claim 10, wherein the step S1 comprises:

initializing the plaintext file, loading the plaintext file needing to be encrypted, and setting a number of code elements for the key file, wherein a byte length of the key file is capable of being customized, and the coding sequence for the initial key file comes from at least one of a text file, an audio, a video, a picture, an image, a graph, a pseudo-random code, or a chaotic value.

19. The computer-readable storage medium of claim 10, wherein the step S2 comprises:

by means of a pseudo-random sequence and various chaotic signals generated by various key stream generators, or by means of a random file with uniform code distribution on a binary system, providing a bit transformation operation rule.

20. The computer-readable storage medium of claim 10, wherein in the step S2, the bit operation rule comprises at least one of the following operation rules:

rule 1: negating a binary bit meeting the following Boolean function:

$F(j)=(C+X\times j)\text{MOD } Y==Z,$ wherein C, X and Z are integers determined in advance, Y is a prime number, and j is a serial number of a binary bit of the key stream; "MOD" represents a remainder operation, and "==" represents an equality judgment operation; or rule 2: negating according to a true value bit or a false value bit of the key stream.

\* \* \* \* \*